Figure 11:
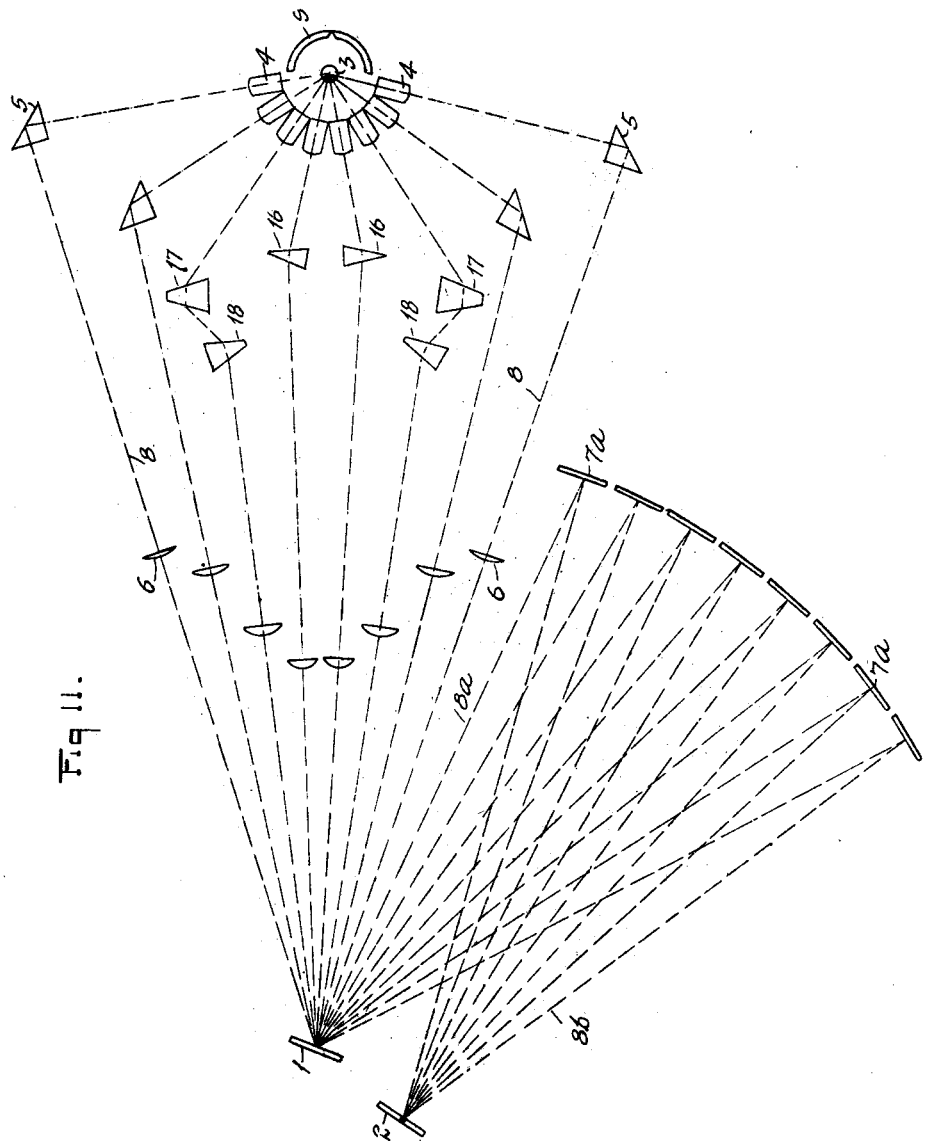

T. V. DIXON.
METHOD OF AND APPARATUS FOR TRANSFORMING MOTION INTO ELECTRICAL WAVES OR IMPULSES.
APPLICATION FILED JULY 19, 1915.
1,193,999.
Patented Aug. 8, 1916.
15 SHEETS—SHEET 1.
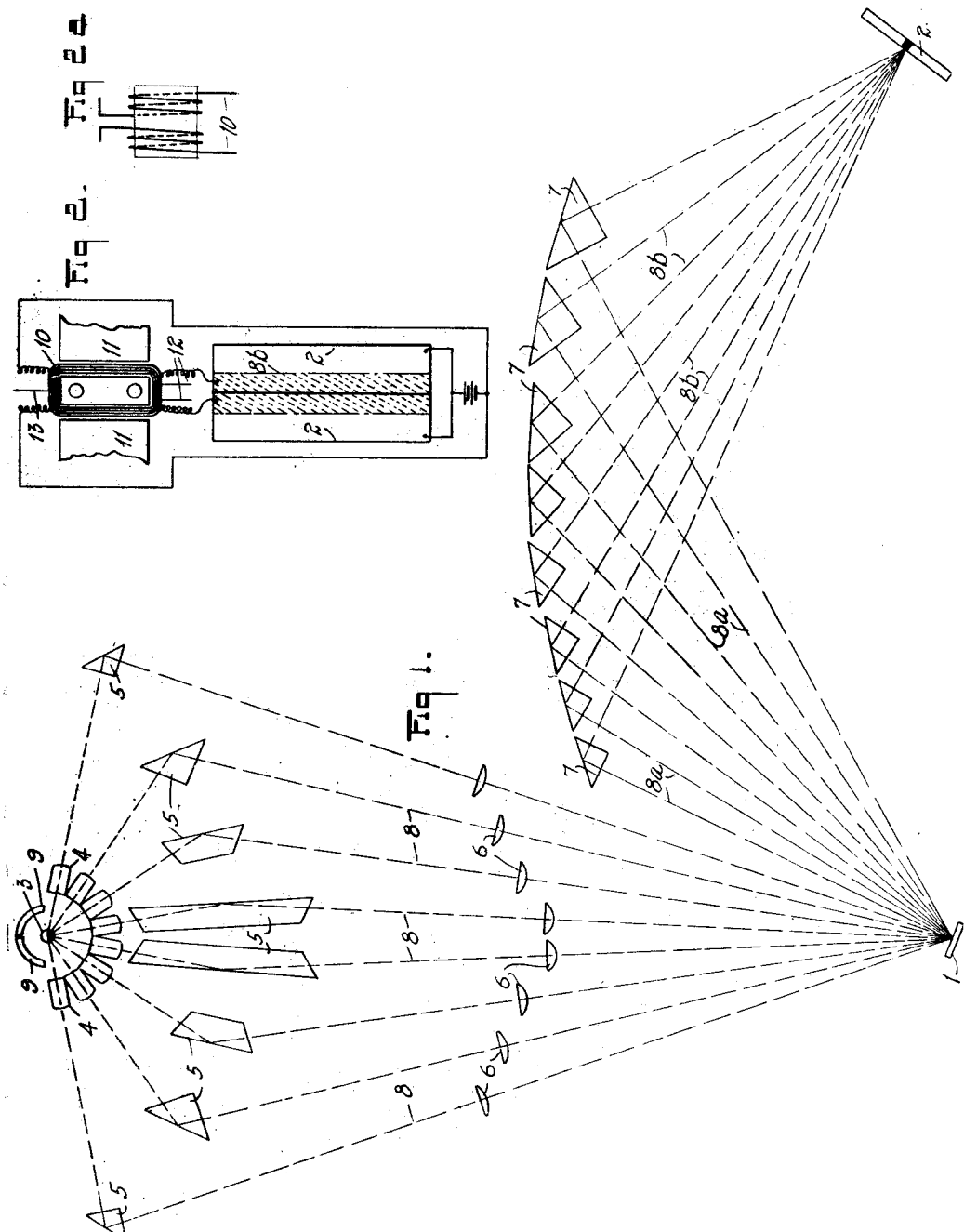

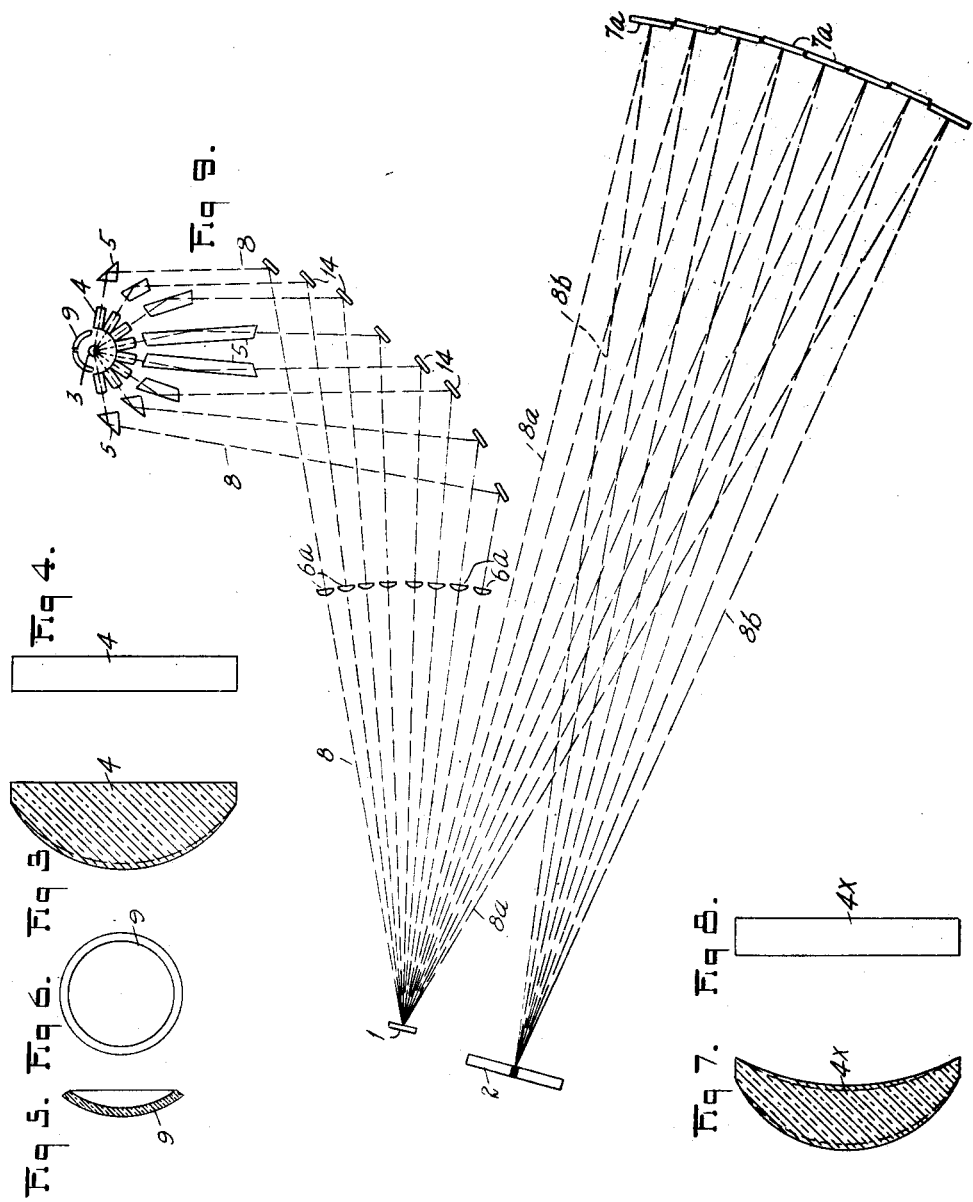

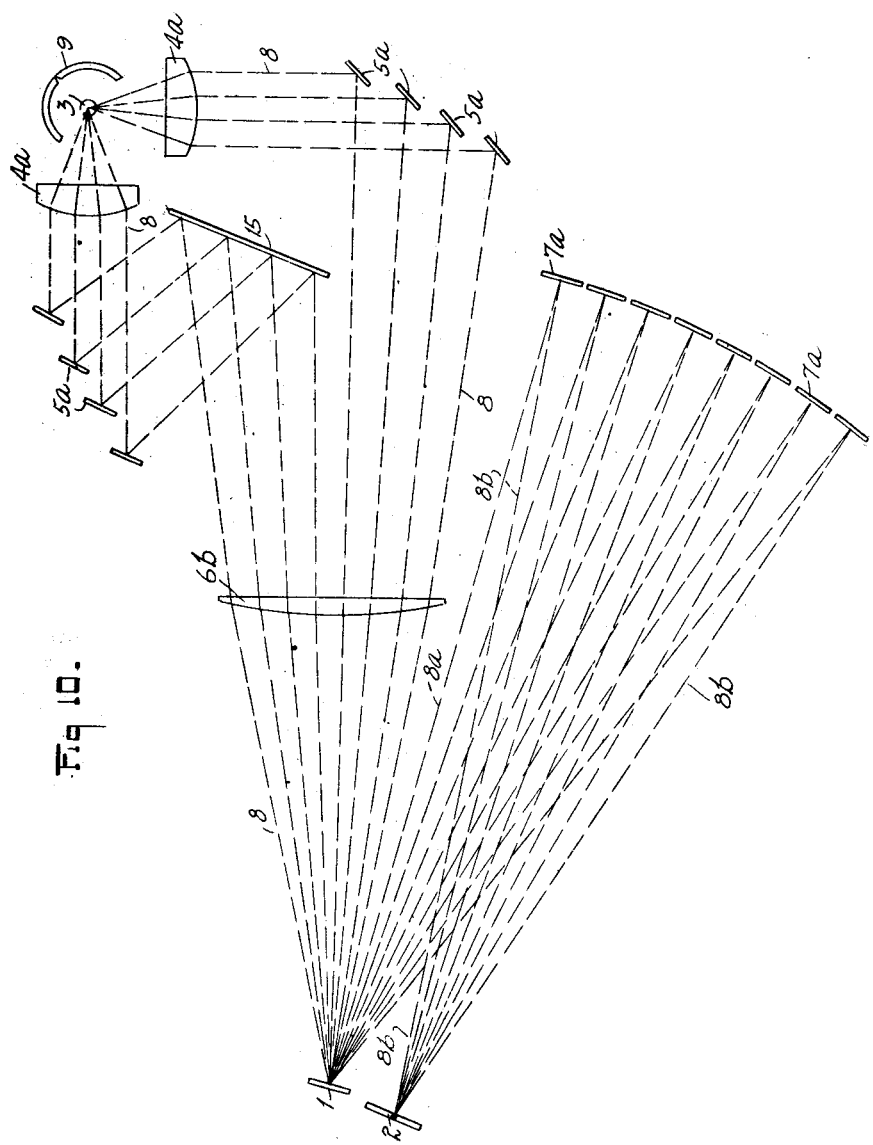

T. B. DIXON.
METHOD OF AND APPARATUS FOR TRANSFORMING MOTION INTO ELECTRICAL WAVES OR IMPULSES.
APPLICATION FILED JULY 19, 1915.

1,193,999.

Patented Aug. 8, 1916.
15 SHEETS—SHEET 4.

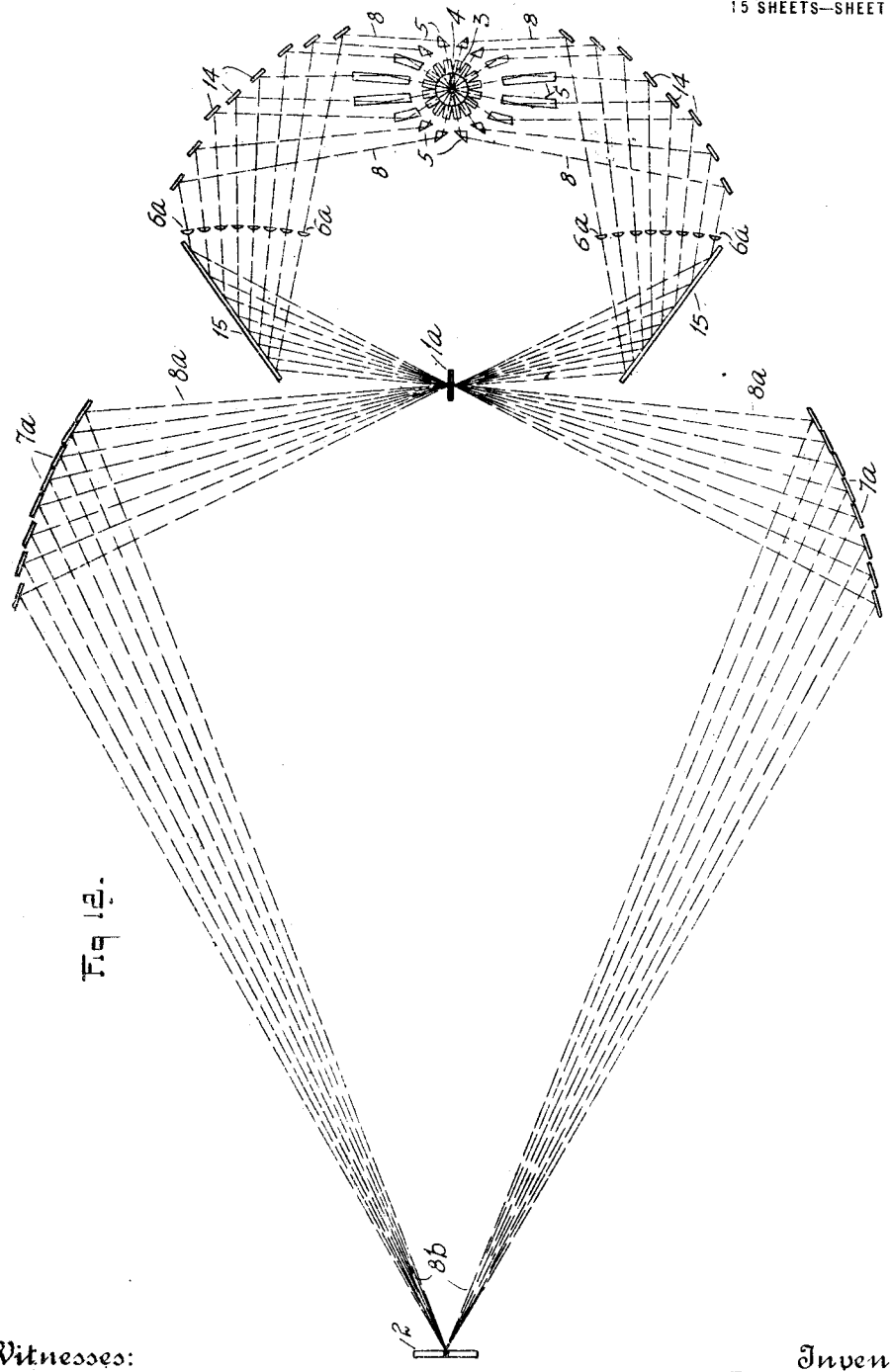

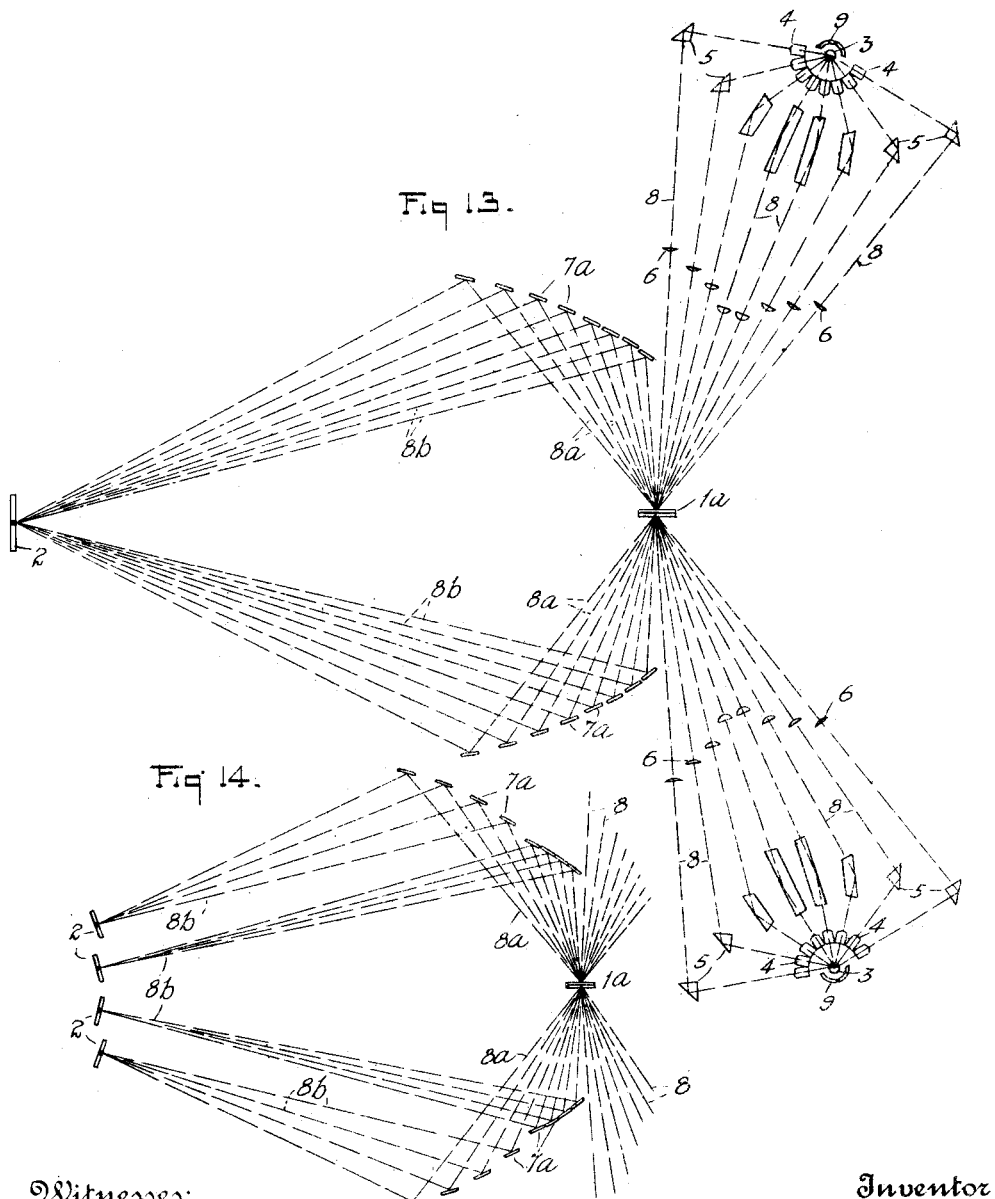

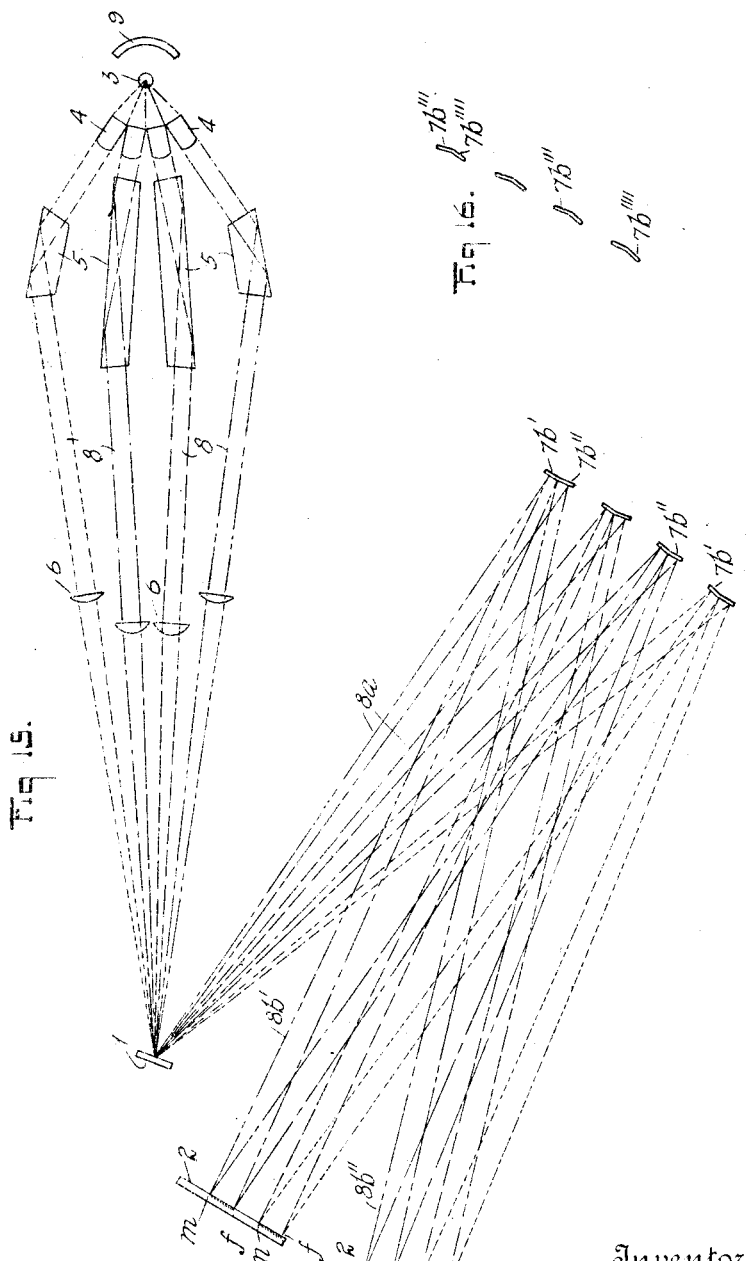

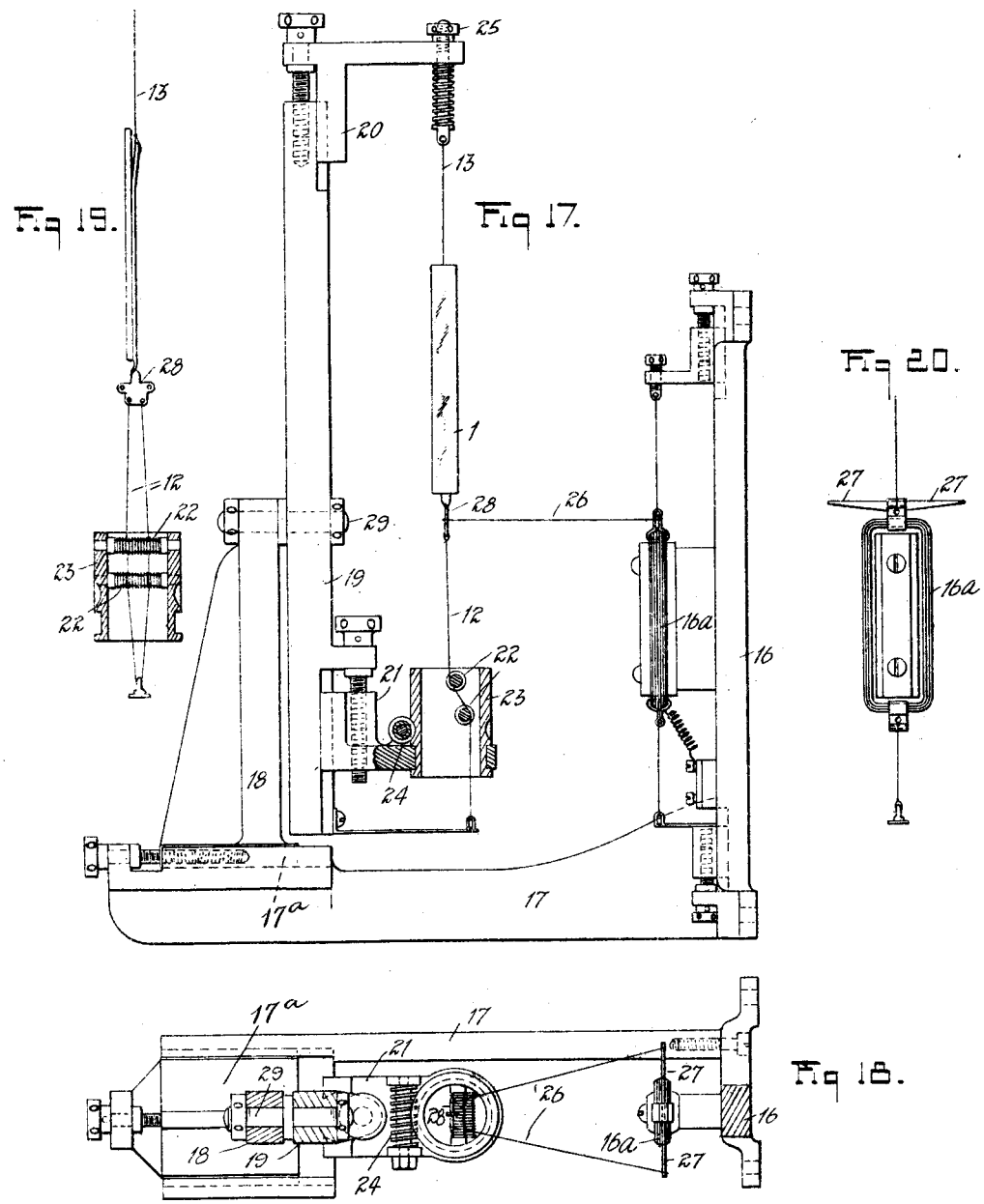

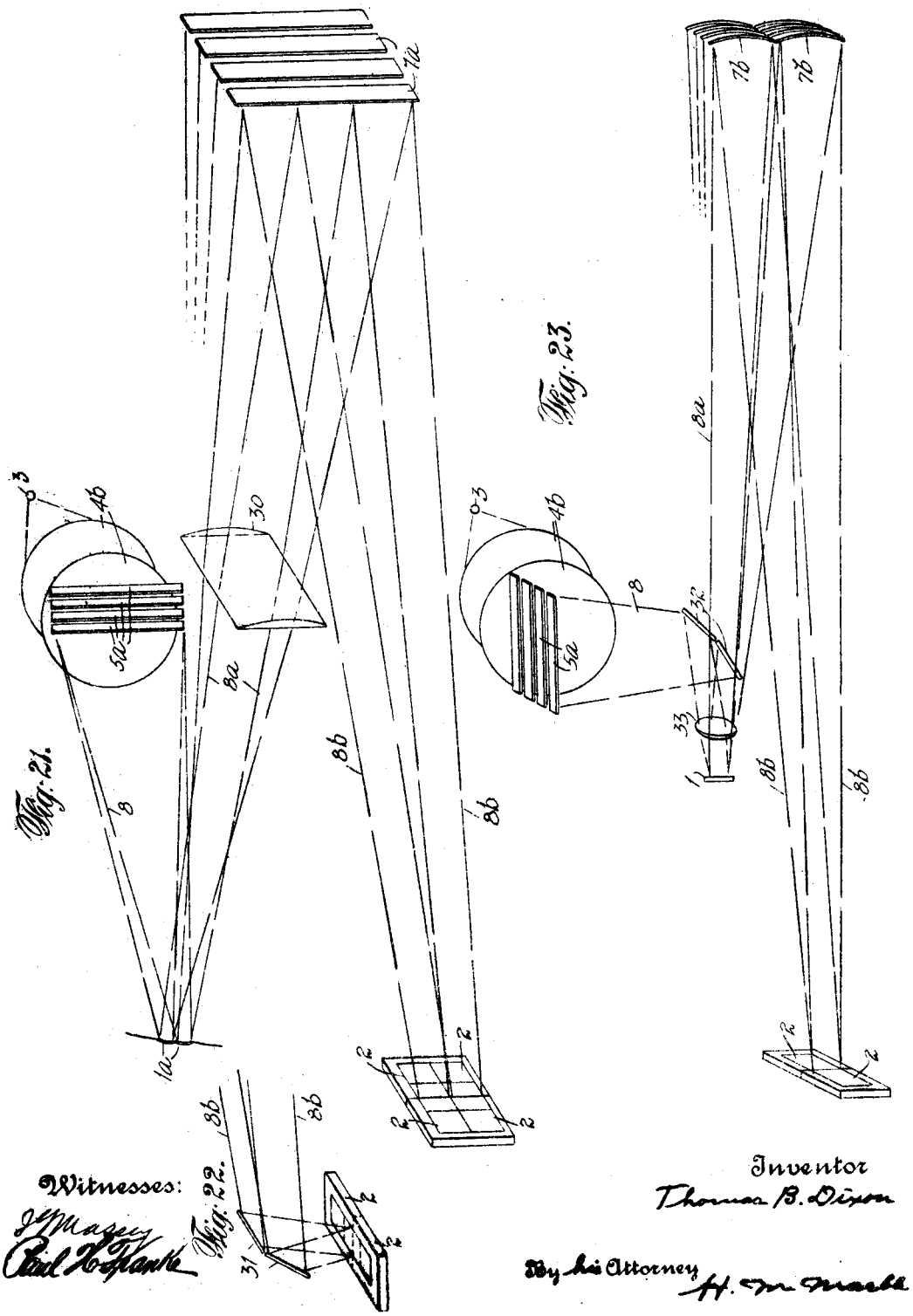

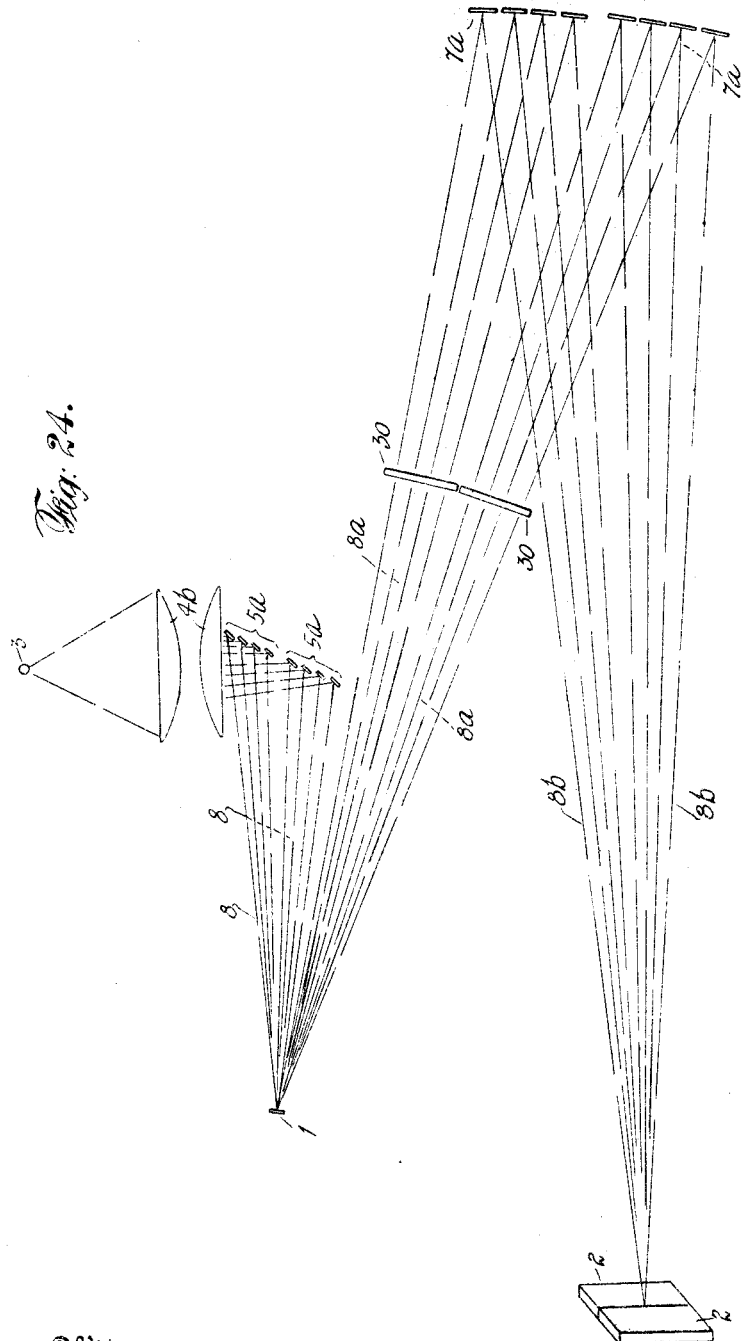

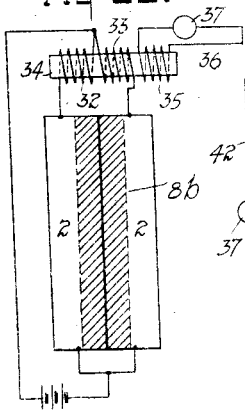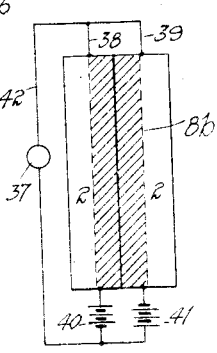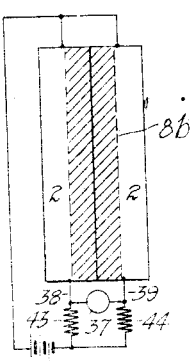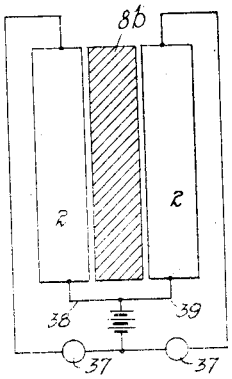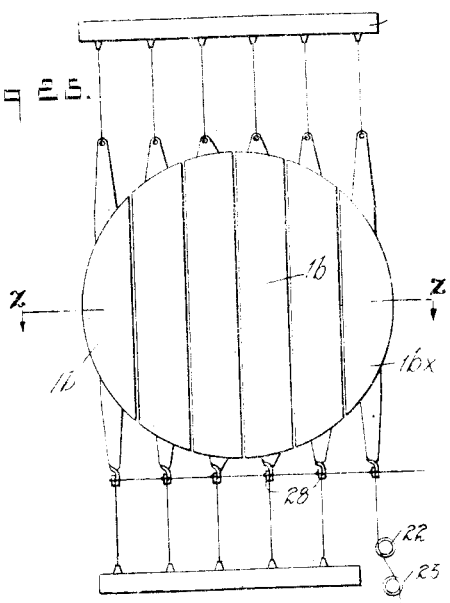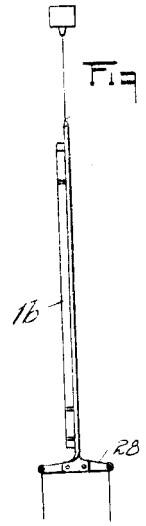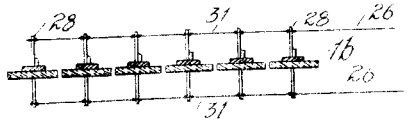

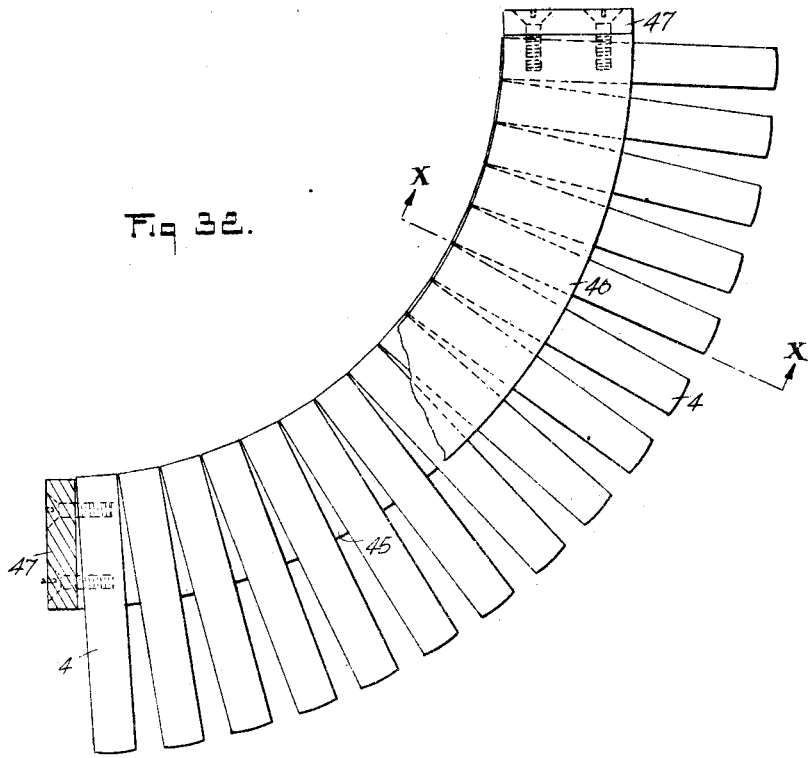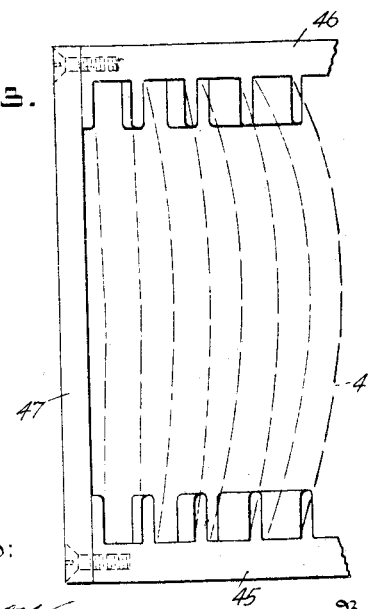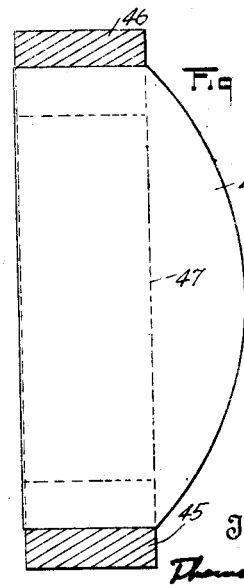

T. B. DIXON.
METHOD OF AND APPARATUS FOR TRANSFORMING MOTION INTO ELECTRICAL WAVES OR IMPULSES.
APPLICATION FILED
1,193,999.
Patented Aug. 8, 1916.
15 SHEETS—SHEET 13.
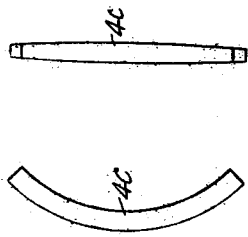
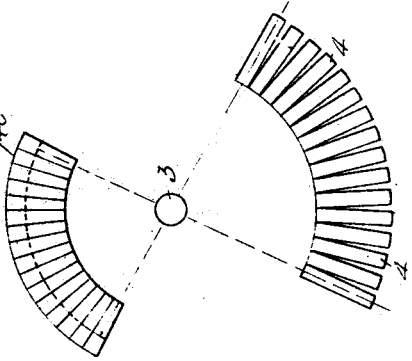
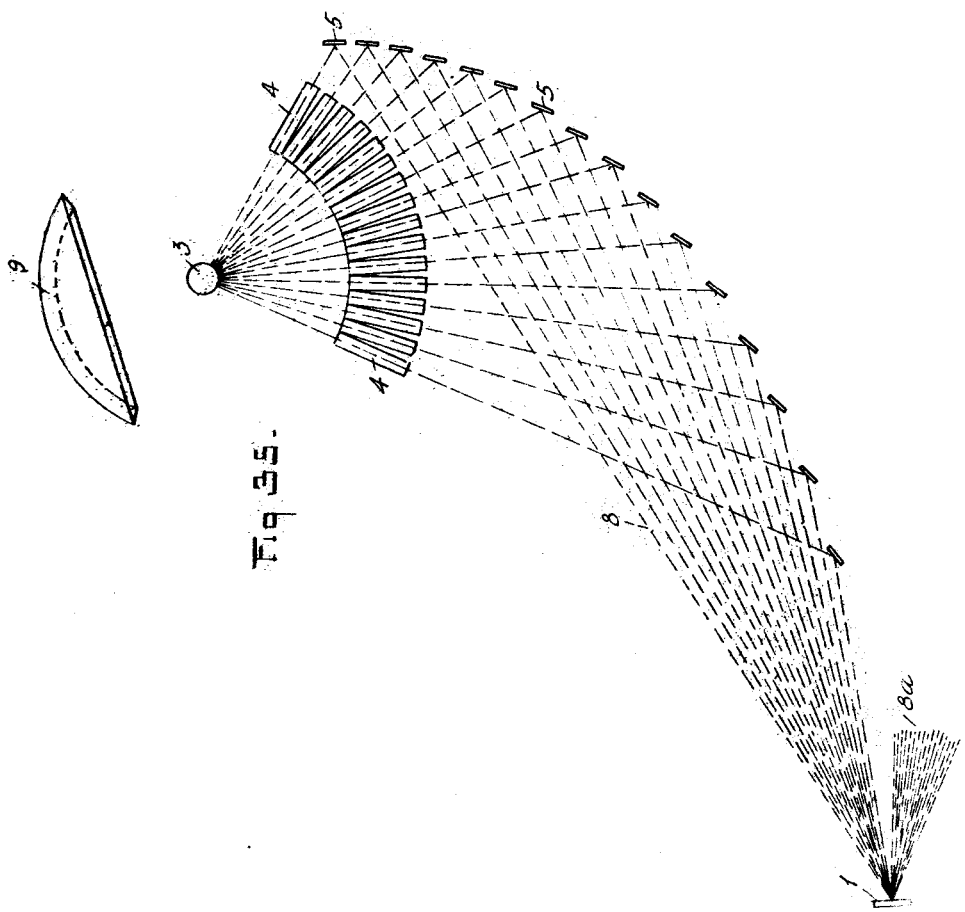

T. B. DIXON.
METHOD OF AND APPARATUS FOR TRANSFORMING MOTION INTO ELECTRICAL WAVES OR IMPULSES.
APPLICATION FILED JULY 19, 1915.
1,193,999.
Patented Aug. 8, 1916.
15 SHEETS—SHEET 14.
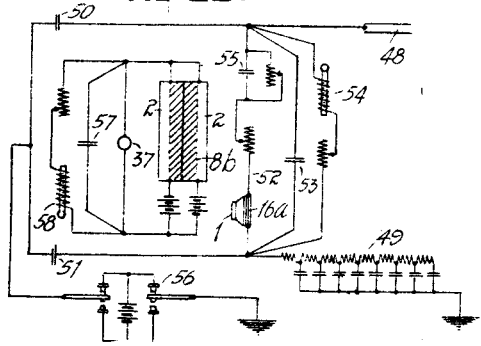
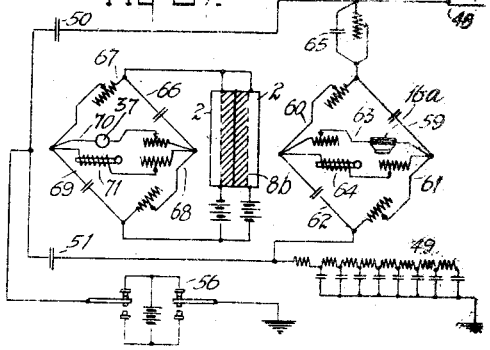
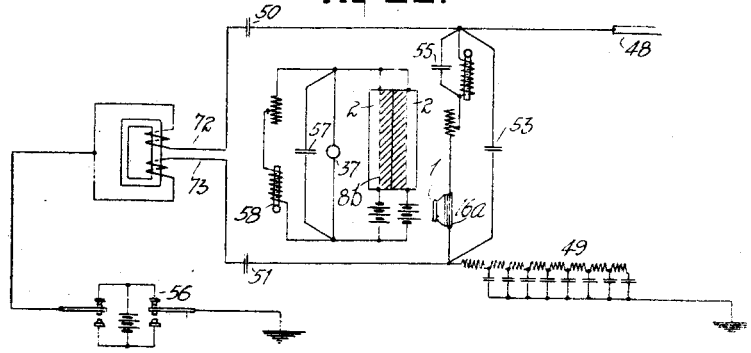
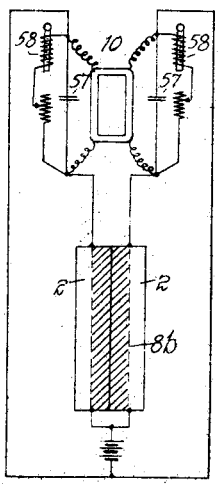
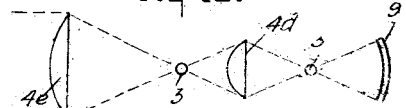
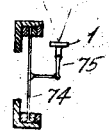
Witnesses
Inventor
Thomas B. Dixon
By his Attorney T. B. DIXON.
METHOD OF AND APPARATUS FOR TRANSFORMING MOTION INTO ELECTRICAL WAVES OR IMPULSES.
APPLICATION FILED JULY 19, 1915.
1,193,999.
Patented Aug. 8, 1916.
15 SHEETS—SHEET 15.
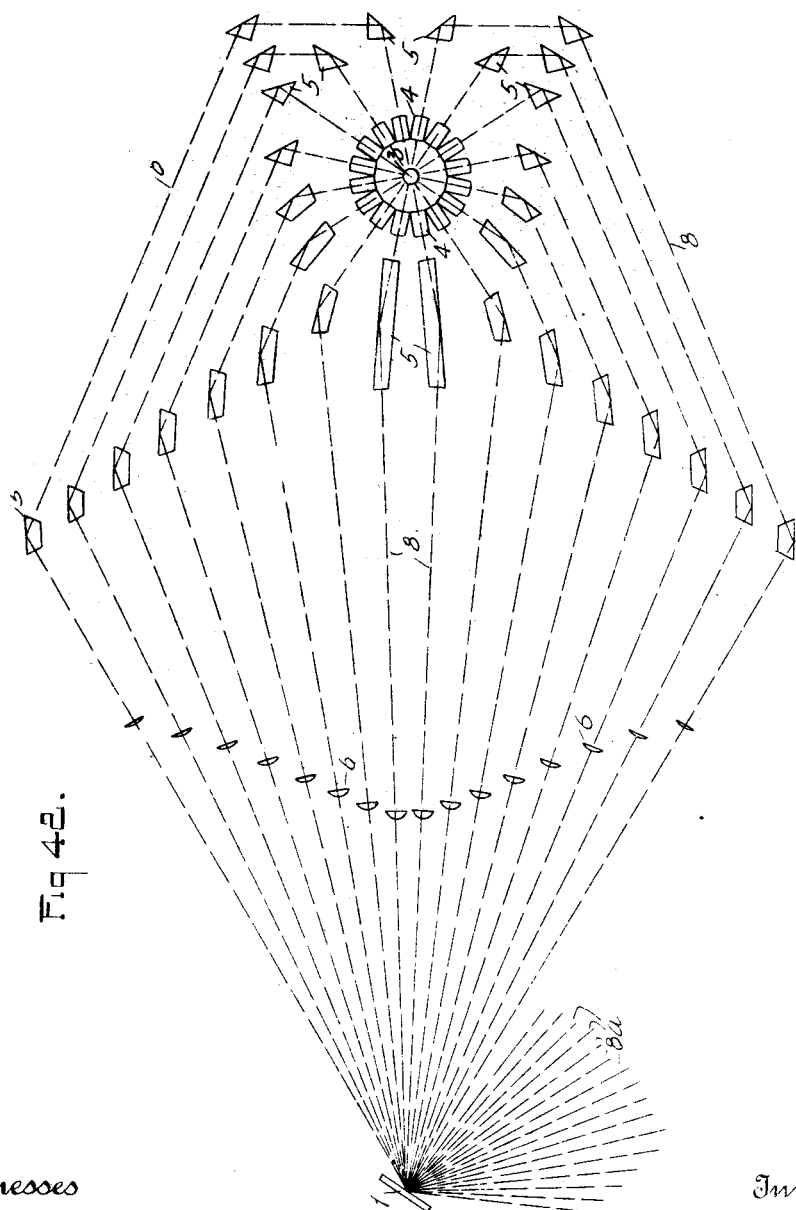

UNITED STATES PATENT OFFICE.

THOMAS BULLITT DIXON, OF NEW YORK, N. Y.

METHOD OF AND APPARATUS FOR TRANSFORMING MOTION INTO ELECTRICAL WAVES OR IMPULSES.

1,193,999.  Specification of Letters Patent.  Patented Aug. 8, 1916.

Application filed July 19, 1915. Serial No. 40,694.

*To all whom it may concern:*

Be it known that I, THOMAS B. DIXON, citizen of the United States of America, and a resident of New York, in the county of New York and State of New York, have invented certain new and useful Improvements in Methods of and Apparatus for Transforming Motion into Electrical Waves or Impulses, of which the following is a specification.

My invention relates to a method of and apparatus for producing current fluctuations in an electric circuit by means of the action of radiant energy—usually a beam or beams of light—on a radio-electric sensitive element or elements, such for example as selenium cells; also a method of and apparatus for transforming motion into electrical waves or impulses, and for amplifying electrical impulses, by means of the action of radiant energy upon radio-electro-sensitive means.

My invention consists in a method of and means for employing a plurality of beams of radiant energy, derived if desired from a single source, and in general acting upon the same radio-electro-sensitive element or group of such elements, the action and motion of all of such beams being controlled by the same primary actuating means (which usually is a reflector, operated by a galvanometer, or by a phonograph or telephone diaphragm or other suitable means).

Other features of my invention will be pointed out hereafter.

The objects of my invention are to obtain greater efficiency of utilization of radiant energy—specifically, light—in the production of current fluctuations in an electric circuit, in the transforming of motion into electrical waves or impulses, and in the amplification of electrical impulses; to permit the efficient coöperative utilization of a plurality of light beams derived from a single source; to permit the efficient coöperative utilization of light beams taken from substantially all sides of a single source of illumination; to make possible the concentration of a plurality of light beams, whether from the same source or from separate sources, upon a single primary-actuating-device reflector, the subsequent separation of such light beams, and their final concentration upon the same radio-electro-sensitive device or a group or groups of such devices; to permit the use, with efficient results, in radio-electric relays, of sources of illumination such as Nernst glowers, incandescent filaments, etc., in lieu of the more powerful but less steady arc light; and to make the apparatus simple, relatively compact, and highly efficient.

Other objects of my invention will appear hereafter.

It has been proposed heretofore to produce current fluctuations in an electric circuit by varying the action of radiant energy (usually a light beam) upon one or more radio-electro-sensitive devices (usually selenium cells), by means of a primary actuating device (usually a mirror actuated by a galvanometer coil); the beam of light being usually caused to move across such selenium cell or cells by the motion of the primary-actuating-device reflector, and so varying the resistance of the selenium cell or cells, and thereby producing electrical waves or impulses in an electric circuit in which such selenium cell or cells is or are included, which electrical waves or impulses are capable of operating sensitive relays and other sensitive electrical apparatus. The efficiency of such apparatus is very largely dependent upon the intensity of illumination of the selenium cell or cells by the light beam, and optical conditions have been thought to preclude the successful use of more than one light beam or pencil from one or more sources of illumination for the same selenium cell or group of cells; furthermore, optical conditions have heretofore seemed to make necessary that this light beam or pencil shall be of very restricted dimensions as compared with the total light emitted by the source of illumination. The present strongest source of illumination which produces its light within such small dimensions as are required for accurate projection, is the electric arc; and while I have used the electric arc with success, still its use is open to the objection that it is not as steady as is desirable; and furthermore, the carbon electrodes require frequent replacement. Other sources of illumination, such as Nernst glowers, tungsten and other high-efficiency incandescent lamp filaments, etc., offer a much more steady illumination, together with a more concentrated source of illumination, but are not as strong sources of illumination as is the electrical arc; nevertheless, I have used with success Nernst filaments.

Obviously, if a number of pencils of light may be derived from a single source of illumination, such for example as a Nernst glower or incandescent lamp filament, a much stronger total illumination may be obtained; but it is practically necessary that the several pencils of light from such source shall be concentrated upon the same moving reflector (though as hereinafter described I have used with success, a plurality of reflectors mounted to move together; but the number of reflectors which can be so mounted to move together and mounted with the delicacy and low inertia factor required for apparatus of this sort is at best small as compared with the total number of light beams which I have found may be derived and utilized from a single source of illumination). Even if a number of reflectors be used, it is practically necessary (except as stated hereinafter) that they be mounted to move about the same axis; therefore, for most purposes, the conditions are much the same, whether a plurality of reflectors be used, or whether a single reflector be used, with all the light pencils concentrated upon that single reflector. Since if a number of light pencils be projected upon a single reflector (or upon a plurality of reflectors mounted to oscillate about a common axis) those pencils of light must be taken from different portions of the sphere of illumination of the source of illumination, and therefore are necessarily divergent relatively, it follows that these pencils of light must be directed convergently (relative to one another) upon the reflector or reflectors; and in consequence these pencils of light will be reflected divergently from that reflector; a condition which has in the past, apparently prevented their subsequent concentration upon a single selenium cell or group of selenium cells; at least I am not aware that any other person has thought of using such a plurality of pencils of light, derived from a single source or plurality of sources of illumination, projected convergently (relatively to one another) upon the same primary-actuating-device reflector, and thence reflected divergently, and then converged upon a single selenium cell or group of cells. I have found, however, that it is quite possible to concentrate such divergent reflected light pencils upon a single selenium cell or cells, and to do so notwithstanding lateral movement of such reflected light pencils, due to motion of the primary-actuating-reflector. Thereby I have been able to obtain, from a single source of illumination, an effective illumination of the selenium cell or cells, many times greater than that which it has been thought to be possible to obtain from such single source of illumination, heretofore. Moreover, I have been able to accomplish this result and yet to keep all of the pencils of light of substantially the same total length from the source of illumination to the selenium cells; a condition which is sometimes desirable.

There are various other factors which have heretofore interfered with obtaining anything approaching the high efficiency and high rate of telegraphic transmission made possible by the apparatus hereinafter described. For example, much difficulty has been experienced in the past in finding means to so control the radiant energy that a sufficiently large displacement or other variation of such energy results from the desirably small variation in the primary actuating device. Obviously, it is important that the primary actuating device shall have very small movements; for it is here only that inertia exists in the apparatus; and obviously the apparatus is the more delicate and the more capable of rapid operation as the inertia factor is less. In fact, the permissible inertia of this primary actuating device or reflector is the starting point and chief limiting factor for optical calculations in connection with the designing of efficient apparatus of this character.

Since, with a radio-electro-sensitive element influenced by the motions of a light beam, the electrical variation is proportional to the surface the illumination of which is varied by a given movement of that beam, it follows that the best distribution of the surface area of the selenium cell or other radio-electro-sensitive device, is had when the cell has either greater height than breadth; (the light beam in such case vibrating in a horizontal plane) or when the cell has greater breadth than height (in which case the light beam vibrates in a vertical plane). Correspondingly, the primary actuating device reflector from which the light beam is reflected and thereby caused to move across the surface of such selenium cell or cells will commonly have great length (in the direction of its axis of oscillation) as compared with its breadth; this condition permitting the inertia of that reflector to be minimum. Another reason for the use of a plurality of light beams is that I have found that for optical reasons it is impossible to project from a single mirror of the small size desired in order that its inertia factor may be small, one beam of light only which is free to move, and also has the requisite length from the movable reflector to the selenium cell or cells and cross-section and intensity to enable the radio-electric-relay to meet all the requirements desired with respect to such a relay. And there are still other factors which make the use of a plurality of light beams, controlled by a single primary-actuatingdevice reflector and sweeping across the same selenium cell or group of cells a vast improvement over the use of a single light beam only.

I will now proceed to describe my invention with reference to the accompanying drawings and will then point out the novel features in claims.

In the drawings: Figure 1 is a diagrammatic view illustrating schematically one form of apparatus embodying the apparatus portion of my invention and adapted for carrying out the method portion of my invention. Fig. 2 is a diagram showing two radio-electro-sensitive elements (usually selenium cells) with circuits therefor, and the magnet poles and armature coils of an instrument of the nature of a galvanometer to be actuated by variation of resistance of those radio-electro-sensitive devices; the view also showing the beam of radiant energy in its normal or middle position on such radio-electro-sensitive device. Fig. 2$^a$ is a diagrammatic view showing the two windings of the galvanometer coil 10 more clearly than said windings are shown in Fig. 2. Figs. 3 and 4 are respectively a vertical section and an end view of one of the segmental condensing lenses employed in the arrangement shown in Fig. 1, and also in arrangements shown in various other figures of the drawing. Figs. 5 and 6 are respectively a vertical section and a front elevation of the spherically-curved reflectors employed back of the source of illumination, in the arrangement shown in Fig. 1, and in arrangements shown in various other figures of the drawings. Figs. 7 and 8 are respectively a vertical section and an end view of a segmental meniscus condensing lens which may be employed in lieu of the plano-convex condensing lens shown in Figs. 3 and 4. Fig. 9 is a view similar to Fig. 1, but illustrating an alternative arrangement of apparatus. Fig. 10 is a further view similar to Fig. 1, but illustrating a still further alternative arrangement of apparatus. Fig. 11 is a view similar to Fig. 1, but illustrating the use for the concentration of certain of the light pencils upon the primary-actuating device, of refracting prisms, in lieu of the total-reflecting prisms shown in Figs. 1 and 9. Fig. 12 is a diagrammatic view illustrating the use of a primary actuating device reflector having two reflecting surfaces, in connection with means for taking light pencils from all sides of a source of illumination and concentrating such pencils finally upon a single radio-electro-sensitive device or group of such devices. Fig. 13 is a view similar to Fig. 12, except that a plurality of sources of illumination are shown, the light pencils from such several sources being concentrated upon the same radio-electro-sensitive device or group of such devices. Fig. 14 is a fragmentary diagrammatic view, similar to Fig. 13, except that the secondary reflectors are shown arranged to divide the various reflected light pencils S$^b$ into groups, and to project the pencils of each group upon a radio-electro-sensitive device or group of such devices, different from that upon which each of the other group of pencils is projected. Fig. 15 is a diagrammatic view illustrating means for dividing the light pencils by means of groups of secondary reflectors arranged angularly. Fig. 16 is a fragmentary diagrammatic view illustrating an alternative arrangement of angularly arranged secondary reflectors which may be employed in lieu of the arrangement shown in Fig. 15. Fig. 17 is an elevation and partial vertical section of one of the galvanometer-coil and primary-actuating-device reflector mountings which may be employed; Fig. 18 is a top view and partial horizontal section of the said mounting; Fig. 19 is a fragmentary elevation of a portion of such mounting, the section being taken on a plane at right angles to that of Fig. 17; and Fig. 20 shows a front view of the galvanometer coil and associated parts. Fig. 21 shows a diagrammatic perspective elevation of an alternative and simplified arrangement of reflectors and light pencils which may be employed. Fig. 22 is a fragmentary diagrammatic view illustrating the use of angularly arranged reflectors for combining upon one group of radio-electro-sensitive devices, the two tiers of light pencils illustrated in Fig. 21. Fig. 23 is a diagrammatic perspective view illustrating a further simplified arrangement of reflectors and light pencils. Fig. 24 is a further diagrammatic view illustrating in plan another arrangement of reflectors and light pencils which may be employed. Fig. 25 shows, more or less diagrammatically a front elevation of a primary-actuating-device reflector arrangement which may be employed, comprising a plurality of reflectors, arranged side by side, and having independent suspensions, but which reflectors nevertheless are arranged to move together; and Fig. 26 shows a horizontal section on the line $z$—$z$ of Fig. 25. Fig. 27 shows a side elevation of the parts shown in Fig. 25. Figs. 28–30 inclusive are diagrams illustrating various arrangements of selenium cell circuits whereby a light pencil or plurality of light pencils acting differentially on selenium cells affects the coil of a siphon recorder or other receiving or re-transmitting apparatus; and Fig. 31 is a similar diagram showing a light beam arranged to act on one or another of two selenium cells alternatively. Figs. 32–34 inclusive illustrate the mechanical structure of one mounting for a plurality of segmental lenses; Fig. 32 showing a top view and partial horizontal section, Fig. 33 showing a fragmentary side elevation, and Fig. 34 a transverse section on the line x—x of Fig. 32. Fig. 35 is a diagram illustrating the action of the light pencils in connection with the lens mounting such as shown in Figs. 32-34 inclusive; Fig. 35ª shows a side elevation, and Fig. 35ᵇ a front elevation of one of a plurality of segmental reflectors which may be used in lieu of a unitary reflector 9 shown in Fig. 35; and Fig. 35ᶜ is a top view showing the arrangement of such segmental reflectors in connection with the source of illumination, and segmental condensing lenses of Fig. 35. Figs. 36, 37 and 38 are diagrams illustrating various cable circuits wherein the disturbing and signal-distorting effects with reference to the coil 16ª of the receiving galvanometer are counter-balanced by means associated with the siphon recorder or other receiving instrument, and whereby a shunted condenser of greater capacity than has been practicable heretofore may be employed in connection with the receiving coil 16ª. Fig. 39 shows diagrammatically the provision of condensers and inductive resistance in shunt relation with respect to the windings of the coil 10 (Fig. 2) of the siphon recorder or other receiving or retransmitting instrument. Fig. 40 is a diagram illustrating the use of a plurality of sources of illumination in series relation. Fig. 41 illustrates more or less diagrammatically the operation of a primary actuating device by the diaphragm of a telephone or phonograph or like instrument. Fig. 42 is a diagram illustrating a development of the lens and reflector arrangement shown in Fig. 1 to derive light pencils from all sides of a single source of illumination.

Referring now to the drawings, and first to Figs. 1 and 2: Numeral 1 designates a primary actuating device, for example, the movable reflector or mirror of a reflecting galvanometer, or a mirror actuated by a telephone or phonograph diaphragm, etc., and 2 designates a radio-electro-sensitive device, for example, a selenium cell or group of such cells, to be affected by the motions of the light beam controlled by the primary actuating device 1. 3 designates a source of illumination. 4—4 a series of primary condensing lenses, arranged in a semi-circle around the light 3 so as to be equi-distant therefrom, each of these condensing lenses being a section or strip taken from the center of a spherical condensing lens, preferably a plano convex lens, as shown in detail in Figs. 3 and 4, or a meniscus lens, 4ˣ, as shown in Figs. 7 and 8. 5—5 designate a series of primary reflectors, preferably prisms, adapted to deflect at proper angles pencils of light from the condensing lenses 4 through the secondary condensing lenses 6—6 upon the primary actuating device 1; and 7—7 designate a group of secondary reflectors, also preferably prisms, adapted to reflect beams of light coming from the several primary reflectors 5, and from the primary actuating device 1, upon the radio-electro-sensitive device 2. For simplicity of illustration, the several pencils of light 8—8 are indicated, in Fig. 1, each by a single dotted line representing the axis of the corresponding pencil of light. For various practical reasons, I prefer to employ light beams, or pencils, which are of rectangular section and are relatively narrow, i. e., the height of which is much greater than their breadth, or vice versa.

In Fig. 2 I illustrate in front elevation two radio-electro-sensitive devices 2, and a cross-section of the light beams 8ᵇ at the point where they impinge coincidentally on the surface of the radio-electro-sensitive devices 2. Primary lenses 4 are so arranged that the pencils of light are projected divergently relatively, and by means of the primary reflectors 5 these relatively divergent pencils are then brought together on the primary actuating reflector 1, each at a definite angle with respect to the other pencils. It will be obvious that the beams 8 might be deflected by refraction through prisms in lieu of reflection, but since such refraction, even where achromatic prisms are employed, involves more or less dispersion, I prefer in general to deflect the beams by reflection. Such a refraction apparatus is shown in Fig. 11.

In Fig. 1 the primary condensing lenses 4 are arranged in a series occupying approximately one-half of the space surrounding the source of illumination 3. To utilize the light from the other half of the space surrounding the source of illumination, I have provided reflectors 9—9, (also shown in Figs. 5 and 6) which in practice are segments of spheres, and reflect forward the light reaching them from the source of illumination, so that the light from all sides of the source of illumination is utilized.

In the operation of this apparatus shown in Fig. 1, the various light pencils 8 projected by the condensing lenses 4, through the primary reflectors 5 and secondary condensing lenses 6, are concentrated upon the primary actuating device 1, and are reflected therefrom as pencils 8ª in divergent paths to the corresponding secondary reflectors 7, and thence are concentrated as pencils 8ᵇ upon the radio-electro-sensitive devices 2. Any small movement of the primary actuating device 1 (and all movements of that primary actuating device are small) produces corresponding movements of the reflected light pencils 8ª, the movement of these reflected pencils in practice, however, being so small that they do not pass out of the fields of their respective secondary reflectors 7; and from these secondary reflectors 7, the further reflected pencils of light 8$^b$, concentrated upon the radio-electro-sensitive device 2, move across the surface of that radio-electro-sensitive device, in accordance with the movements of the primary actuating device 1. As shown particularly in Fig. 2, such movements of the pencils of light vary the illumination of the two radio-electro-sensitive devices 2 in opposite senses, i. e., increase the illumination of one of such radio-electro-sensitive devices, and simultaneously decrease the illumination of the other, thereby decreasing the electrical resistance of the one radio-electro-sensitive device and increasing the electrical resistance of the other radio-electro-sensitive device, and so causing movement of the receiver coil 10, such coil 10 being in the field of force produced by the magnet poles 11—11. It will be observed that although a large number of separate pencils of light are derived from the same source of illumination, yet since these pencils of light are all concentrated upon the same radio-electro-sensitive devices, the effect of movement of the primary actuating device 1, with respect to the receiver coil 10, is the summation of the effects of the individual pencils of light; that is to say, the movement of each individual pencil of light has the same effect, in causing deflection of the receiver coil 10, that that movement would have if none of the other pencils of light were present; but the combined effect of the movements of the various pencils of light is the summation of the effects that each individual pencil of light would cause.

The receiver coil 10 is a double coil, comprising two independent windings, (see Fig. 2$^a$), one in circuit with one electro-sensitive device 2, the other in circuit with the other electro-sensitive device 2, the two windings of the coil 10 neutralizing each other when the current strengths in both coils are the same. Increase of resistance of one radio-electro-sensitive device, and decrease of resistance of the other radio-electro-sensitive device, therefore, produces a combined effect in the two windings of the receiver coil 10, substantially equal to twice the deflective effect that variation of resistance of one radio-electro-sensitive device 2 only would cause. I have indicated a torsional mounting for the receiver coil 10, comprising two lower suspension fibers 12, and a single upper suspension fiber 13. However, the particular method of suspension of the receiver coil is not material to the present invention.

The size of the condensing lens image formed, by any one pencil of light, at the radio-electro-sensitive devices 2, is determined by the size and focus of the corresponding primary condensing lens 4, the focal length of the secondary condensing lens 6 through which the beam passes, and the total length of the beam from the primary condensing lens to the radio-electro-sensitive devices 2. In the arrangement shown in Fig. 1, the beams projected from the light source 3 to the primary actuating device 1 at the smaller angles have less total length than those projected at the larger angles; and in order that the lens images shall be uniform or approximately of uniform size and as perfectly defined as possible, the secondary condensing lenses 6 for the shorter pencils of light are of shorter focus than those of the longer pencils, and are placed correspondingly closer to the primary actuating device 1. With this arrangement, and with proper adjustment, the several beams may be made of uniform cross section at the point of final impingement on the radio-electro-sensitive devices 2, although the images of the illuminant projected by the longer pencils on the reflector 1 are somewhat larger than the images of the illuminant projected by the shorter pencils. I prefer to employ primary condensing lenses 4 of the same focal length, and of a shorter focal length than that of any of the secondary condensers 6, this arrangement permitting the primary condensing lenses to be placed at the smallest practical distance from the illuminant, so that each receives the maximum amount of light.

In Fig. 9 I have shown an arrangement in many respects similar to Fig. 1, wherein the secondary condensing lenses, there designated by numerals 6$^a$, are of the same focal length, an intermediate series of reflectors 14 being interposed between the primary reflectors 5 and the secondary condensing lenses 6$^a$. In this arrangement shown in Fig. 9, the lengths of the various pencils of light from the source of illumination to the primary actuating device 1 are the same; the intermediate series of reflectors 14 being used in order that such may be the case. In Fig. 9 I have also indicated the use of mirror reflectors 7$^a$ in lieu of the prism reflectors 7 of Fig. 1.

Instead of employing, as in Figs. 1 and 9, a large number of small segmental primary condensing lenses 4—4, I may employ a lesser number of larger primary condensing lenses, each such condensing lens serving for a plurality of pencils of light. Such an arrangement is shown in Fig. 10, wherein I have shown two primary condensing lenses 4$^a$—4$^a$, the light beam through each of these condensing lenses being divided into a number of separate pencils by reflectors 5$^a$—5$^a$. One secondary condensing lens, 6$^b$, is shown for all of these pencils of light, the light pencils from one of the condensers 4$^a$ being reflected through this secondary condenser 6$^b$ directly from the reflectors 5$^a$; while the pencils of light from the other condenser 4$^a$ are reflected through the secondary condenser 6$^b$ by means of an intermediate reflector 15. The condensing lenses 4ᵃ, the reflectors 5ᵃ, and the intermediate reflector 15, are so arranged that all of the pencils of light have approximately the same length from the source of illumination to the primary actuating device 1; a circumstance which permits the use of a single secondary condensing lens 6ᵇ for all of these pencils of light.

In Fig. 11, I show an arrangement, before referred to, wherein the pencils of light are deflected by refraction through prisms instead of by reflection through primary reflectors 5, or 5ᵃ, as in the previous views. In this Fig. 11, as in Fig. 1, a plurality of segmental primary condensing lenses 4 are employed, and the pencils of light, necessarily divergent from one another, are refracted by the prisms to the primary actuating device 1. In the case of the central light pencils, which require refraction through a small angle only, plain refracting prisms 16 may be employed; but in the case of prisms requiring refraction through a large angle, pairs of achromatic prisms 17 and 18 are preferable. For light pencils of still greater angle, such as the extreme light pencils shown in Fig. 11, reflecting prisms 5, such as employed in Fig. 1, for example, are preferable.

It is sometimes convenient to employ, for the primary actuating device, a double-surfaced reflector. Such a reflector is illustrated in Figs. 12 and 13, (which are similar views except in the respect noted hereafter,) and is there designated by numeral 1ᵃ. It may be supposed to be composed of two very thin pieces of glass or quartz, each having a mirror-surface on its back, the backs of the two glass or quartz pieces placed together, such two reflectors mounted to move as one. A plurality of pencils of light may be projected upon each of the reflecting surfaces of such a double reflector by any of the arrangements shown in the preceding figures, or by equivalent or similar arrangements, and thence reflected as illustrated in the preceding figures; and the pencils of light so projected upon the two sides of the reflector may be derived all from the same source of illumination (as shown in Fig. 12,) or from two or more separate sources of illumination (as shown in Fig. 13), as preferred. The arrangement shown in Fig. 13 is particularly suitable for combining light beams from a plurality of sources of illumination, and directing such pencils upon the same radio-electro-sensitive devices; while the arrangement shown in Fig. 12 avoids the use of reflectors 9 in rear of the source of illumination, enabling light to be derived from all sides of the source of illumination with equal efficiency.

As illustrated in Fig. 14, groups of light pencils reflected from the two groups of secondary reflectors, as indicated in Figs. 12 and 13, may act upon different selenium cells instead of upon the same selenium cell or cells, as in Figs. 12 and 13. Also, as indicated in Fig. 14, the reflectors of each group of secondary reflectors may be arranged so as to divide reflected pencils of light into a plurality of groups, each such sub-group of light pencils acting upon a separate selenium cell or set of selenium cells.

Fig. 15 shows an arrangement, which has certain advantages, particularly when the selenium cells available are much broader than the desired breadth of the light pencils employed. In the arrangement shown in this figure, the secondary reflectors, to which the light pencils are reflected by the primary actuating device 1, are arranged to split each pencil from the primary actuating device 1, into a plurality of light pencils, (into two light pencils in the arrangement shown in Fig. 15). To this end, each of the secondary reflectors, is divided into two reflectors, designated by numerals 7ᵇ′ and 7ᵇ″, respectively, placed at an obtuse angle to one another. In this Fig. 15 I have indicated the light pencils, not by single lines representing the axes of such pencils, as in the previous figures, but by lines representing the outer limits of the light pencils. Each light pencil, 8ᵃ, reflected from the primary actuating device 1, is divided into two reflected light pencils 8ᵇ′ and 8ᵇ″. It is characteristic of systems using angularly-arranged pairs of reflectors, such as 7ᵇ′ and 7ᵇ″, that, with movement of the primary actuating device 1, one margin only of each reflected pencil 8ᵇ′ and 8ᵇ″ moves.

In Fig. 15 I have designated by reference letter $f$ the fixed margins of the pencils, and by reference letter $m$ the movable margins of the pencils. For convenience in following the pencils in Fig. 15, each pencil incident upon one of the double reflectors 7ᵇ′—7ᵇ″, and the corresponding reflected pencils into which each such incident pencil is divided by said reflectors, is indicated by dotted lines different from the dotted lines by which the other beams are indicated.

As indicated in Fig. 16, each pair of reflectors, there designated by numerals 7ᵇ‴ and 7ᵇ⁗ may be placed at less than 180° to each other, instead of more than 180° to each other, as in Fig. 15. In the use of reflectors as arranged in Fig. 16, the light pencils incident upon such reflectors are split up each into two reflected pencils, as in Fig. 15, the directions of the various reflected pencils being, of course, different from those of the reflected pencils shown in Fig. 15; though in general, the optical effect of reflectors arranged as in Fig. 16, is practically the same as that of the reflectors arranged as in Fig. 15.

In Figs. 17–20 inclusive I illustrate the actual construction of galvanometer-coil and galvanometer-mirror mounting which I prefer. Such mountings are in general similar to those commonly employed for the coils of a siphon recorder. Numeral 16 designates a bracket adapted to be mounted near the poles of field magnets (such as are commonly employed in siphon recorders) with the galvanometer coil $16^a$ in the field of the magnets. This bracket has an extension 17 provided with a slide $17^a$ upon which is mounted a further bracket 18 carrying an upright 19 forming the reflector support. 1 designates the reflector, suspended by a torsional suspension comprising two lower fibers 12 and an upper fiber 13. Slides 20 and 21 are provided for adjustment of position of the reflector and for adjustment of suspension-tension. The lower suspension fibers 12 pass over grooved pins 22 mounted in a barrel 23, rotatable by means of a worm screw 24; and by rotation of this barrel 23 and rotation of the screw 25 to which the upper fiber 13, is connected, the annular position of the mirror may be adjusted. The galvonometer coil $16^a$ has the familiar torsional suspension. This coil is connected to the reflector by means of delicate fibers 26, commonly called traces, connected to arms 27 projecting from the coil $16^a$ and to a light bracket 28 connected to the mounting of the reflector 1. The arrangement is such that the tension of the coil suspension, and the tension of the reflector-suspension, may be adjusted as desired. Furthermore, by reason of the greater spread of the traces 26 where connected to the coil $16^a$ than where connected to the reflector 1, any slight angular motion of the coil $16^a$ imparts to the reflector 1 a much greater angular motion. The upright 19 is mounted upon a pivot screw 29 whereby that upright may be moved into various angular positions.

Figs. 21, 22, 23 and 24 illustrate further of the very many possible alternative arrangements of reflectors and light pencils which may be employed. In these figures means for the production of a relatively small number of separate light pencils are illustrated, but it will be obvious from the preceding figures that the number of light pencils employed might be much greater. In the arrangement shown in Fig. 21, 3 designates as before the source of illumination. Instead of employing segmental condensing lenses, as in various of the preceding figures, I have here illustrated the ordinary double-condensing lenses $4^b$ such as are commonly used in projecting lanterns, and in front of these condensing lenses I have shown four primary reflectors $5^a$, and two primary actuating device reflectors $1^a$ located one above another and which may be understood to have a common fiber suspension so that both of these reflectors $1^a$ oscillate about the same axis. I have further shown these primary actuating device reflectors $1^a$ to be concave reflectors; for in some cases I have found it convenient to use concave reflectors for the primary actuating device reflectors in lieu of the plane reflectors indicated in the previous views. The reflectors $7^a$ are so arranged that they project light pencils from one of the primary-actuating device reflectors $1^a$ upon the lower group of selenium cells 2—2 and project light pencils from the other primary actuating device reflector $1^a$ upon the upper group of selenium cells 2—2.

The curved primary actuating device reflectors $1^a$ employed are commonly spherical reflectors, and therefore tend to concentrate their light pencils in both horizontal and vertical planes; and to still further concentrate these light pencils in one plane I have provided intermediate the reflectors $1^a$ and $7^a$, a plano-cylindrical convex lens 30, the cylindrical axis of this lens being in the plane of oscillation of the reflected light pencils $8^a$, so that this lens does not reduce the range of movement of these light pencils.

Instead of employing two tiers of selenium cells 2, further reflectors 31 may be employed, as shown in Fig. 22, to concentrate the two tiers of light pencils $8^b$ upon a single pair of selenium cells 2.

In the further arrangement shown in Fig. 23, a group of light pencils 8 from the condensing lenses $4^b$ are reflected by two reflectors 32, placed angularly with respect to one another, (and which therefore split the light pencils into light pencils of two tiers) through a spherical concentrating lens 33 upon a primary actuating device reflector 1, and thence are reflected, past the edge of lens 33, as light pencils $8^a$, to other reflectors $7^b$, shown here as curved reflectors; the employment of lens 33 and curved reflectors $7^b$ serving the same purpose as the employment, in Fig. 21, of curved primary actuating device reflectors $1^a$ and the concentrating lens 30. The reflectors $7^b$ concentrate the two tiers of light pencils $8^b$ upon a single pair of selenium cells 2.

In the arrangement shown in Fig. 24 the primary reflectors $5^a$ are divided into two groups, producing two groups of light pencils $8^a$ which are concentrated upon the same primary actuating device reflector 1, and thence are reflected, as two reflected groups of pencils $8^b$, through plano-cylindrical concentrating lenses 30 upon two groups of secondary reflectors $7^a$, which secondary reflectors concentrate the two groups of light pencils upon the same pair of radio-electro-sensitive devices 2.

Obviously, I might illustrate very many more arrangements of means for dividing light from a single source or plurality of sources of illumination into a plurality of distinct pencils of light, for concentrating such distinct light pencils upon one or more primary actuating devices 1, and then finally concentrating the reflected light pencils upon one or more selenium cells 2; but the illustrations herein are believed to be sufficient to indicate the essential nature of my invention.

I have stated above that if a number of primary actuating device reflectors 1 are to be employed, it is practically necessary (except as to be stated hereafter) that they be mounted to move about the same axis; and in Fig. 21 I have indicated two primary actuating device reflectors, there designated by numeral $1^a$, mounted to oscillate about the same axis. In Figs. 25 and 26 I illustrate an arrangement of primary actuating reflectors, there designated by numerals $1^b$, which oscillate, not about the same axis, but about parallel axes. The several reflectors $1^b$ shown in Fig. 25 may be considered to be separate segments of one large reflector; there being slight clearance between the several segments to permit free oscillation about their separate axes. If such a large reflector were employed in one piece, its inertia would be so great as, practically, to preclude its use in sensitive high speed apparatus; but by dividing such a large reflector into a number of parallel segments, which rotate each about its own axis, the combined inertia of the several segments is made very much less than would be the inertia of a one piece reflector which the several segments represent, in a sense. The mounting of one of these segments, which I have designated by numeral $1^{bx}$, may be understood to be the same as illustrated in Figs. 17–20 inclusive; and it is oscillated by means of traces 26 connected to a galvanometer coil, not shown in Fig. 25, but similar to the coil $16^a$ shown in Figs. 17, 18 and 20. Brackets 28 of the other reflectors $1^b$ are connected to the bracket 28 of the reflector $1^{bx}$ by means of traces 31. It will be clear that the several reflectors $1^b$ and $1^{bx}$, so connected, oscillate in unison; and it will be clear that, in accordance with the principles, and by the means, hereinbefore illustrated and described, the various light pencils reflected from such segmental reflectors may be concentrated upon the same selenium cell or group of cells. A group of segmental reflectors such as shown in Fig. 25 is particularly suitable for use when the source of illumination is such that it is difficult or impracticable to concentrate the pencils from that source upon a very narrow reflector. An arc lamp having fairly large carbons is an illustration of one such source of illumination; the image of the arc (or the craters of the carbons) being more or less approximately circular.

In Fig. 2 I have illustrated one of various possible arrangements of circuits whereby a plurality of selenium cells, over which a light pencil or plurality of light pencils plays differentially, may act differentially on a coil of a siphon recorder or other receiving or retransmitting apparatus. In Figs. 28–31 I illustrate others of the many possible arrangements. In the arrangement shown in Fig. 28 the circuits of the two selenium cells 2 pass through differential primary windings 32 and 33 of an induction coil 34, the secondary coil 35 being in a circuit 36 leading to any suitable signal-receiving or signal retransmitting apparatus 37; which signal receiving or retransmitting apparatus may be a siphon recorder such as is used in the ordinary cable transmission, or a relay, or a transmitter or repeater, or even a telephone receiver or transmitter. It will be understood that the movements of the light pencil or pencils over the selenium cells 2 of Fig. 28 decrease the resistance of one such cell and increase the resistance of the other such cell, and thereby produce variations in the flow of current through coils 32 and 33 which induce corresponding current variations in the secondary coil 35 and circuit 36.

I have stated above that the primary actuating device reflector 1 may be actuated by a telephone or phonograph diaphragm. In such case the instrument 37 may well be a telephone receiver; or, if that instrument 37 be a telephone transmitter, then the complete apparatus comprising the primary actuating device 1 operated by a telephone receiver or phonograph diaphragm, the light beam and selenium cell arrangements, and the telephone transmitter employed as instrument 37, becomes a very efficient telephone relay. In fact, in any of the various arrangements shown herein, the receiving device operated by the selenium cell circuits, may be a telephone receiver or transmitter. The arrangement shown in Figs. 2 and 28 have important advantages electrically, because the "extra currents" set up in the coil 10 (Fig. 2) or the primary windings of induction coil 34 (Fig. 28) have higher resistances to overcome relative to the electromotive forces of such extra currents than in the other arrangements shown in Figs. 29 and 30 and 31; and therefore in the arrangement of Figs. 2 and 28 the retarding effect of such extra currents upon the coil or other receiving device, such as a telephone transmitter or receiver (as explained hereafter), is diminished.

In the arrangement shown in Fig. 29 the selenium cells 2 are in separate circuit branches 38 and 39 having opposing batteries 40 and 41 respectively; the circuit 42, to which the branch circuits 38 and 39 are connected, containing the receiving instrument 37.

The arrangement shown in Fig. 30 is similar to that shown in Fig. 29, except that one battery only is employed, the receiving instrument 37 being bridged across the branch circuit conductors 38 and 39 and resistances 43 and 44 being provided. The arrangement shown in Fig. 30 is in fact, a Wheatstone bridge arrangement, wherein the two selenium cells 2 constitute two arms of the bridge, the resistances 43 and 44 constituting the other two arms of the bridge, the receiving instrument 37 being in the cross wire of the bridge.

In the arrangement shown in Fig. 31 the two selenium cells 2 are spread apart somewhat so that the light pencil or pencils 8$^b$ do not illuminate either cell 2 when said light pencils are in normal rest position; but any considerable deflection of said light pencils to one side or the other causes illumination of one cell or the other. The two selenium cells are in branch circuits 38 and 39 having a common battery, and in this arrangement I have shown two receiving instruments 37, one in branch circuit 38 and the other in branch circuit 39. The arrangement shown in Fig. 31 is most suitable for a cable relay, the instruments 37 being transmitters, one of them to transmit dots and the other to transmit dashes. (By the terms dots and dashes as used above. I do not mean to imply that the dots and dashes are of different lengths necessarily, but rather that the dots shall be current impulses of one sign and the dashes current impulses of the opposite sign.)

In Figs. 32–34 inclusive I have illustrated the mechanical construction of one arrangement of condenser-lens mounting which I have found to be particularly desirable, and in Fig. 35 I have indicated diagrammatically the corresponding light beam arrangement. I have found that with a sufficient number of segmental condensing lenses 4 mounted within an arc of about 90°, and with a reflector 9 (see Fig. 35) of corresponding angle behind the source of illumination, light pencils sufficient in number and intensity for all ordinary signaling purposes may be obtained, such light pencils having, with sufficient approximation, the same length from the source of illumination to the selenium cells.

As indicated particularly in Fig. 35, reflectors 5 are provided to concentrate the various light pencils upon the primary actuating device reflector 1. In Fig. 35 I have not indicated the secondary reflectors for concentrating the light pencils from the primary actuating device 1 upon selenium cells; but it will be understood that any of the secondary reflector arrangements shown in the previous figures is suitable. The arrangement shown in Fig. 35 is particularly desirable, because there being no lenses (such as the lenses 6 of Fig. 1) between the segmental condenser lenses 4 and the primary actuating device reflector and the selenium cells, the image of the illuminant 3 may be so projected upon the selenium cells as to be sharply defined thereon; and when, as is preferable, the illuminant is a straight incandescent filament, (such as that of a Nernst lamp or a tungsten incandescent lamp or the like) such sharply defined image may be of the same shape, and of substantially the same size, as one of the selenium cells. The combined images of the illuminant, so sharply defined upon the surfaces of the selenium cells, appear to give to those cells a more intense and brilliant illumination than do the combined images of the various segmental condensing lenses 4, concentrated upon such selenium cells.

In lieu of a single reflector 9, as shown in Fig. 35, I may employ a plurality of strip reflectors 4$^c$, as indicated in Figs. 35$^a$, 35$^b$ and 35$^c$. The mounting for these strip reflectors may be similar to the mounting for the segmental condensing lenses 4, shown in Figs. 32, 33 and 34. These strip reflectors have certain optical advantages over the single reflector 9 shown in Fig. 35; for one thing, the reflecting surfaces of the several reflectors are exactly similar.

The construction of lens mounting for the segmental condensing lenses 4, shown in Figs. 32, 33 and 34, is as follows: There is a quadrant-shaped base plate 45, grooved radially to receive the bases of the lenses 4, and a corresponding top plate 46 similarly grooved to receive the tops of the lenses, these base and top plates being connected at their ends by end pieces 47. This makes a very rigid lens mounting, wherein the lenses are held firmly at precisely proper angles and distances relatively.

In the high speed duplex operation of submarine cable circuits much difficulty has been experienced heretofore due to the difficulty of obtaining a sufficiently close balance between the main and artificial lines, and also to inductive disturbances and earth currents (particularly in the shore end connections). Various means have been employed heretofore for reducing such difficulties, such as the shunting of the receiving instrument by condensers, and by inductive resistances (which are commonly termed, in this sense, "magnetic shunts"). So far as I am aware, none of these arrangements have proved highly successful, one reason being that if the capacity of the shunting condenser or condensers be sufficiently high to obviate the harmful effects of the disturbances mentioned, there is a tendency to distortion of the signals manifesting itself chiefly in the form of an overthrow beyond the zero line. For this reason it has not been practicable heretofore to employ condensers of sufficiently large capacity shunted around the receiving instrument to eliminate to the desired degree disturbances due to the causes mentioned. I have found, however, that when the actuating coil (for example, the galvanometer coil 16ª of Fig. 17) is located in the cable circuit as the ordinary cable receiving instrument is located, with capacity and inductive resistance shunted around it, and when the coil 10 in the selenium cell circuit is similarly provided with shunted capacity and inductive resistance, the capacity and inductive resistance so shunted around the coil in the selenium cell circuit tend both to eliminate any remaining disturbances not eliminated by the capacity around coil 16ª and to neutralize the effect of overthrow and other signal distortion of the galvanometer coil 16ª in the cable circuit; so that the capacity shunted around the galvanometer coil 16ª in the cable circuit may be made of much greater value than heretofore, and therefore disturbances due to the lack of balance of the duplex, induction and earth currents are neutralized to a much greater extent than heretofore. Figs. 36, 37 and 38 illustrate various cable circuits wherein such neutralizing effect is obtained.

Fig. 36 shows the well known Wheatstone bridge arrangement of receiving circuits and instruments at one end of a cable circuit. with my improved selenium cell arrangement added; 48 being the incoming cable end, 49 the artificial line, 50 and 51 condensers commonly provided in the main line and artificial line, 52 the cross wire of the bridge wherein the coil 16ª of my receiving apparatus is located, and 53 capacity shunted around that coil 16ª and 54 inductive resistance also shunted around that coil 16ª; also, I have shown the usual receiving shunted condenser 55 in the cross wire 52 of the bridge. Suitable regulating non-inductive resistances are provided, as is customary. I have also shown the usual transmitting apparatus 56 connected to the apex of the bridge. Selenium cells 2 are shown arranged to be actuated by light pencils projected upon them by the reflector operated by the coil 16ª, and 37 designates the receiving instrument operated by the selenium cell circuits. I have shown capacity 57 shunted around this receiving instrument 37, also inductive resistance 58 likewise shunted around this receiving instrument. I have found that by giving proper values to the capacity 57 and to the inductive resistance 58 a much higher value can be given to the capacity 53 than has been practicable heretofore, and thereby disturbances such as due to imperfect balance, induction, earth currents, etc, are neutralized to such an extent that, whereas without the capacity 57 and inductive resistance 58 the signals would be unreadable even at quite low speeds, yet with the shunted capacity 57 and inductive resistance 58, together with a condenser 53 of the higher capacity, perfect signals may be produced; in fact, the disturbances mentioned are for all practical purposes, eliminated.

In the arrangement shown in Fig. 37 the coil 16ª of the receiving apparatus is located within a secondary Wheatstone bridge comprising arms 59, 60, 61 and 62, and a cross wire 63, arms 59 and 62 containing capacity, and arms 60 and 61 containing non-inductive resistance, and the cross wire also containing resistance, there being an inductive shunt 64 around the coil 16ª in this cross wire; there being also a shunted condenser 65 in series with the secondary bridge. I have shown the receiving instrument 37 (comprising, it will be understood, the coil 10—Fig. 2) of the selenium cell circuits in another Wheatstone bridge comprising arms 66, 67, 68 and 69, and a cross wire 70, there being capacity in arms 66 and 69 and there being non-inductive resistance in arms 67 and 68; and there being a magnetic shunt 71 around the receiving instrument 37. In this case also the capacity and inductance in the selenium cell circuits of instrument 37 coact with the capacity and inductance employed in connection with the line coil 16ª to neutralize the disturbing effects mentioned and distortion of signals. The selenium cell circuits of Figs. 36 and 37 may be interchanged, since either selenium cell circuit arrangement of these two figures is equally suitable for use with the line instrument circuits shown in those figures.

In Fig. 38 I have shown what is known as the magnetic bridge arrangement wherein the receiving coil 16ª is bridged across between the main line and artificial line, and is shunted by capacity 53, the line and artificial line passing through opposing inductive resistance coils 72 and 73. I have shown in this figure the same selenium cell circuits as in Fig. 36, but the selenium cell circuits of Fig. 37 are equally suitable for the arrangement shown in Fig. 38.

In Fig. 2 I have shown the coil 10 of the receiving instrument controlled by the selenium cells as differentially wound. In Fig. 39 I show a similar arrangement with capacity 57 and inductive resistance 58 shunted around each coil, as in Fig. 36.

In Fig. 40 I show an arrangement comprising a plurality of sources of illumination with coacting reflectors and condensing lenses, which permits the projection of light from a plurality of sources of illumination through the same final condensing lens. In this figure, numerals 3 designate a plurality of sources of illumination placed one behind the other, with a reflector 9 behind the rearmost source of illumination, and a condensing lens 4$^d$ between that rearmost source of illumination and the front source of illumination 3, and a further condensing lens 4$^e$ in front of the foremost source of illumination; this condensing lens 4$^e$ corresponding to the group of segmental condensing lenses 4 of Fig. 1 and several of the other figures, or to the condensing lenses 4$^a$ of Fig. 10, or to the condensing lenses 4$^b$ of Figs. 21, 23 and 24. It will be apparent that the light from the rearmost source of illumination 3, reflected in part by the reflector 9, passes through the condensing lens 4$^d$ and past the front source of illumination 3, and thence with the light from the front source of illumination 3, passes through the condensing lens 4$^e$; after which the light may be split up into a plurality of light pencils as shown in preceding figures. This arrangement shown in Fig. 40 is particularly suitable where the sources of illumination are extremely compact; for example, are extremely narrow bodies such as the incandescent filaments of a Nernst lamp, tungsten incandescent lamp, etc. Such filaments cast no shadow when light is thrown upon them, and so, by the means shown in Fig. 40, a plurality of sources of illumination may project light through the same condensing lens 4$^e$ along the same central axis.

I have mentioned previously that the primary actuating device reflector may be operated by a telephone or phonograph diaphragm instead of by the galvanometer coil. This is illustrated in Fig. 41, wherein 74 designates a diaphragm (either a telephone or phonograph diaphragm) having a connection 75 to a delicately mounted reflector 1, the arrangement being such that the operation of the diaphragm causes the reflector 1 to oscillate. This reflector 1 may act upon light beams in precisely the same manner as do the reflectors 1 of previous figures. I have not indicated any particular means for operating the diaphragm 74, as such operating means may either be the diaphragm-operating means customarily employed in telephone instruments, or such diaphragm operating means as are customarily employed in phonographs.

Fig. 42 shows a diagram of the reflector arrangement shown in Fig. 1, to take light pencils from all sides of a source of illumination 3 and project the same upon a primary actuating device reflector 1. The arrangement shown comprises segmental condensing lenses 4, together with a plurality of total reflecting prisms 5, there being, in some cases, two or more such total reflecting prisms to each light pencil, as may be required in the case of light pencils taken from the rear of the source of illumination.

While, in the above description, I have generally referred to selenium cells as constituting the specific radio-electro-sensitive devices employed, I do not by any means restrict myself to the use of selenium cells, as other types of radio-electro-sensitive devices may be employed, for example, actinium cells (which action of actinium to radiant energy being understood to be the reverse of that of selenium). Also, under some conditions thermo-piles or thermal-couples may be employed.

While I have generally referred to light as a specific form of radiant energy commonly employed, I do not restrict myself to the use of light, but may use various other forms of radiant energy (heat for example) in the case of thermo-piles or thermal-couples, and the term illumine and like terms are to be understood, with reference to the action of radiant energy, to be inclusive of action of radiant energy of all classes on radio-electro-sensitive means of all types.

By the method of and means for producing current fluctuations in an electric circuit by means of the action of a plurality of light pencils hereinbefore described, I have been able to attain an increase of speed of over 100% over a cable about eleven hundred miles in length, using an arrangement substantially similar to that shown in Fig. 35, but with twelve light pencils only. The apparatus gave every indication of being operative with perfect signals at much higher speeds of transmission, provided a greater number of light pencils, or a higher voltage in the selenium cell circuits, or a more intense source of illumination, be employed.

In most of the figures of the drawings wherein separate lenses are shown arranged in a circle or arc of a circle around the source of illumination, for clearness of illustration such lenses have been shown as each subtending an angle which is relatively large as compared with the angle subtended by each of the lenses shown in Figs. 32 and 35. I consider that in practice it is desirable to employ thin segmental condensing lenses which, being thin, each subtend a small angle only; for, in general, it is desirable that the light pencils shall be quite narrow; and therefore I think it preferable to employ a considerable number of lenses each subtending a small angle rather than to employ a smaller number of lenses each subtending a larger angle. In general, the intensity of illumination of the selenium cells is directly proportional to the number of light pencils coincident upon such cell or cells.

What I claim is:

1. The herein described method of transforming motion into electrical waves or impulses, which comprises concentrating a plurality of separate pencils of radiant energy at a definite point, and permitting them to diverge from such point of concentration, and thereafter concentrating said pencils of radiant energy upon one or more radio-electro-sensitive devices, and by acting upon such pencils of radiant energy at their point of first concentration causing variation of the action of said pencils of radiant energy upon said radio-electro-sensitive device or devices, and consequent variation of an electric current or currents in a circuit or circuits containing such radio-electro-sensitive device or devices.

2. The herein described method of transforming motion into electrical waves or impulses, which comprises concentrating a plurality of separate pencils of light at a definite point and reflecting them divergently relatively to one another, from such point of concentration, and thereafter concentrating such pencils of light upon one or more radio-electro-sensitive devices, and by varying the angle of reflection of said pencils of light at said first point of concentration causing motion of said pencils of light across the surface of said radio-electro-sensitive device or devices, and thereby causing consequent variation of an electric current or currents in a circuit or circuits containing said radio-electro-sensitive device or devices.

3. The herein described method of transforming motion into electrical waves or impulses, which comprises deriving a plurality of separate pencils of light from different portions of the sphere of illumination of an illuminant, concentrating such pencils of light at a definite point and reflecting them divergently, relatively to one another, from such point of concentration, and thereafter concentrating such pencils of light upon one or more radio-electro-sensitive devices, and by varying the angle of reflection of said pencils of light at said first point of concentration causing motion of said pencils of light across the surface of said radio-electro-sensitive device or devices, and thereby causing consequent variation of an electric current or currents in a circuit or circuits containing said radio-electro-sensitive device or devices.

4. The combination with a source of radiant energy, a primary actuating device, means for concentrating a plurality of separate pencils of radiant energy from that source upon such primary actuating device, such primary actuating device adapted to permit the said pencils of radiant energy to pass from it, and to be varied by it, and means for concentrating upon one or more radio-electro-sensitive devices the said pencils of radiant energy after they have passed from such primary actuating device.

5. The combination with a source of illumination, a primary actuating device, means for concentrating a plurality of separate pencils of light from that source of illumination upon such primary actuating device, said primary actuating device adapted to permit the pencils of light to pass from it, and be deflected variably by it, and means for concentrating upon one or more radio-electro-sensitive devices the said pencils of light after they have passed from said primary actuating device.

6. The combination with a source of illumination, of a movable reflector, means for deriving a plurality of separate pencils of light from such source of illumination and for concentrating the said pencils upon said reflector, and means for concentrating upon one or more radio-electro-sensitive devices the reflected pencils of light, whereby motion of said reflector causes the concentrated reflected pencils of light to move in unison across the surface or surfaces of said radio-electro-sensitive device or devices.

7. The combination with a source of illumination, of a movable reflector, means for deriving a plurality of separate pencils of light from such source of illumination, and for concentrating the said pencils upon said reflector, one or more radio-electro-sensitive devices, and secondary reflecting means arranged to concentrate upon such radio-electro-sensitive device or devices the pencils of light reflected from said movable reflector.

8. The combination with a source of illumination, of a movable reflector, means surrounding in part at least such movable reflector, for deriving a plurality of separate pencils of light from such source of illumination, means for concentrating such several pencils of light upon said reflector, a radio-electro-sensitive device, and means for concentrating thereon the pencils of light reflected by said movable reflector.

9. The combination with a source of illumination, of a movable reflector, a plurality of segmental condensing lenses surrounding, in part at least, the said source of illumination, and arranged to derive from that source a plurality of separate pencils of light, means for concentrating the said pencils of light upon said movable reflector, one or more radio-electro-sensitive devices, and means for concentrating thereon the pencils of light reflected from said movable reflector.

10. The combination with a source of illumination, of a movable reflector having reflecting means on opposite sides, means for concentrating upon each of such sides a plurality of relatively convergent light pencils, one or more radio-electro-sensitive devices, and means for concentrating thereon the light pencils reflected from the two reflecting means of such movable reflector.

11. The combination with a source of illumination, of a movable reflector having reflecting means on opposite sides, means for deriving a plurality of separate pencils of light from such source of illumination, and for concentrating some of such pencils upon one of said reflecting means of the reflector, and for concentrating others of such light pencils upon the other reflecting means of such movable reflector, one or more radio-electro-sensitive devices, and means for concentrating thereon the pencils of light reflected from the reflecting means of said movable reflector.

12. The combination of a primary actuating device, means for concentrating a plurality of relatively convergent pencils of light upon such primary actuating device, said primary actuating device adapted to permit the pencils of light to pass from it, and to be deflected variably by it, and means for concentrating upon one or more radio-electro-sensitive devices the said pencils of light after they have passed over said primary actuating device.

13. The combination with one or more radio-electro-sensitive devices, of a movable reflector adapted to reflect light upon such radio-electro-sensitive device or devices, and by its movement to cause the light to move across the surface of such radio-electro-sensitive device or devices, a source of illumination, and means for deriving a plurality of separate pencils of light from such source and for concentrating the said pencils upon said reflector, and thereafter upon said radio-electro-sensitive device or devices, and comprising means in the path of one or more of the pencils of light for rendering the images of the pencils of light, where incident upon said radio-electro-sensitive device or devices, of approximately the same size notwithstanding different total lengths of such light pencils from the source of illumination to said radio-electro-sensitive device or devices.

14. The combination with one or more radio-electro-sensitive devices, of a movable reflector adapted to reflect radiant energy upon such radio-electro-sensitive device or devices, and by its movement to cause such radiant energy to move across the surface of such radio-electro-sensitive device or devices, a source of radiant energy, and means for deriving a plurality of separate pencils of radiant energy from such source, and for concentrating the said pencils upon such reflector, and thereafter upon such radio-electro-sensitive device or devices, and comprising means for rendering the images of such pencils of radiant energy where incident upon such radio-electro-sensitive device or devices, of approximately the same size notwithstanding different total lengths of such pencils of radiant energy from the said source to said radio-electro-sensitive device or devices.

In testimony whereof I have signed this specification in the presence of two subscribing witnesses.

THOMAS BULLITT DIXON.

Witnesses:
H. M. MARBLE,
PAUL H. FRANKE.